United States Patent
Gupta et al.

(10) Patent No.: US 9,891,930 B2
(45) Date of Patent: Feb. 13, 2018

(54) RAPID IDENTIFICATION OF OBJECT PROPERTIES IN AN EVOLVING DOMAIN MODEL OF AN ENTERPRISE APPLICATION ON THE CLOUD

(71) Applicant: SAP SE, Walldorf (DE)

(72) Inventors: Vipul Gupta, Bangalore (IN); Rick Banerjee, Bangalore (IN)

(73) Assignee: SAP SE, Walldorf (DE)

( * ) Notice: Subject to any disclaimer, the term of this patent is extended or adjusted under 35 U.S.C. 154(b) by 93 days.

(21) Appl. No.: 15/147,143

(22) Filed: May 5, 2016

(65) Prior Publication Data
US 2017/0322778 A1    Nov. 9, 2017

(51) Int. Cl.
| | | |
|---|---|---|
| G06F 9/44 | (2006.01) | |
| G06F 9/45 | (2006.01) | |
| G06F 7/00 | (2006.01) | |
| G06F 17/30 | (2006.01) | |

(52) U.S. Cl.
CPC .............. *G06F 9/4428* (2013.01); *G06F 8/24* (2013.01); *G06F 9/443* (2013.01); *G06F 17/30321* (2013.01); *G06F 17/30377* (2013.01); *G06F 17/30433* (2013.01); *G06F 17/30525* (2013.01); *G06F 17/30867* (2013.01)

(58) Field of Classification Search
None
See application file for complete search history.

(56) References Cited

U.S. PATENT DOCUMENTS

| | | | | |
|---|---|---|---|---|
| 7,657,522 B1* | 2/2010 | Puzicha | ............ | G06F 17/30011 707/723 |
| 2003/0051229 A1* | 3/2003 | Boyle | ................... | G06F 9/4433 717/116 |
| 2010/0153862 A1* | 6/2010 | Schreiber | .............. | G06F 9/4448 715/760 |
| 2014/0258316 A1* | 9/2014 | O'Hagan | .......... | G06F 17/30557 707/756 |

* cited by examiner

*Primary Examiner* — Lewis A Bullock, Jr.
*Assistant Examiner* — Mark Gooray
(74) *Attorney, Agent, or Firm* — Fish & Richardson P.C.

(57) ABSTRACT

The present disclosure involves systems, software, and computer implemented methods for identifying traits of an object. In one example, a set of traits is identified in an object-oriented system. A set of trait rules is identified. A trait data structure is generated. A set of classes in the object-oriented system is identified. For each class in the set of classes, a metadata structure is constructed. For each trait in the trait data structure, a trait rule in the trait computation rules structure is identified. The trait rule is applied to the particular metadata structure to generate a trait rule result. Whether the particular class has the particular trait is determined based on the trait rule result. In response to a determination that the particular class has the particular trait, the trait data structure is updated. The updated trait data structure indicates that the particular class has the particular trait.

18 Claims, 9 Drawing Sheets

US 9,891,930 B2

RAPID IDENTIFICATION OF OBJECT PROPERTIES IN AN EVOLVING DOMAIN MODEL OF AN ENTERPRISE APPLICATION ON THE CLOUD

TECHNICAL FIELD

The present disclosure relates to systems, software, and computer-implemented methods for identifying object properties in an enterprise application.

BACKGROUND

Traits are properties or characteristics of an object. In a large multi-tenant enterprise cloud environment supported by an object-oriented system, there is a frequent need to check whether an object has a specific trait.

SUMMARY

The present disclosure involves systems, software, and computer-implemented methods for identifying traits of an object (e.g., an instance of a class) in an object-oriented system.

In an implementation, a set of traits in an object-oriented system is identified. Each trait represents a characteristic of an object in the object-oriented system. A trait computation rules structure is identified. The trait computation rules structure includes a set of trait rules. Each trait rule is composed of expressions (or a strategy) and corresponds to a distinct trait in the set of traits. A trait data structure for the object-oriented system is generated. The trait data structure includes at least the set of traits and a set of data structures. For example, the trait data structure includes a hash table with hash keys as traits and hash values as heaps containing class or object IDs. Each data structure corresponds to a distinct trait in the set of traits. A set of classes in the object-oriented system is identified. For each class in the set of classes, the following operations are performed. A metadata structure for the particular class is constructed. For each trait in the trait data structure, the following operations are performed. A trait rule corresponding to the particular trait in the trait computation rules structure is identified. The trait rule is applied to the particular metadata structure to generate a trait rule result. Whether the particular class has the particular trait is determined based on the trait rule result. In response to a determination that the particular class has the particular trait, the trait data structure is updated. The updated trait data structure indicates that the particular class has the particular trait.

While generally described as computer-implemented software embodied on non-transitory, tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
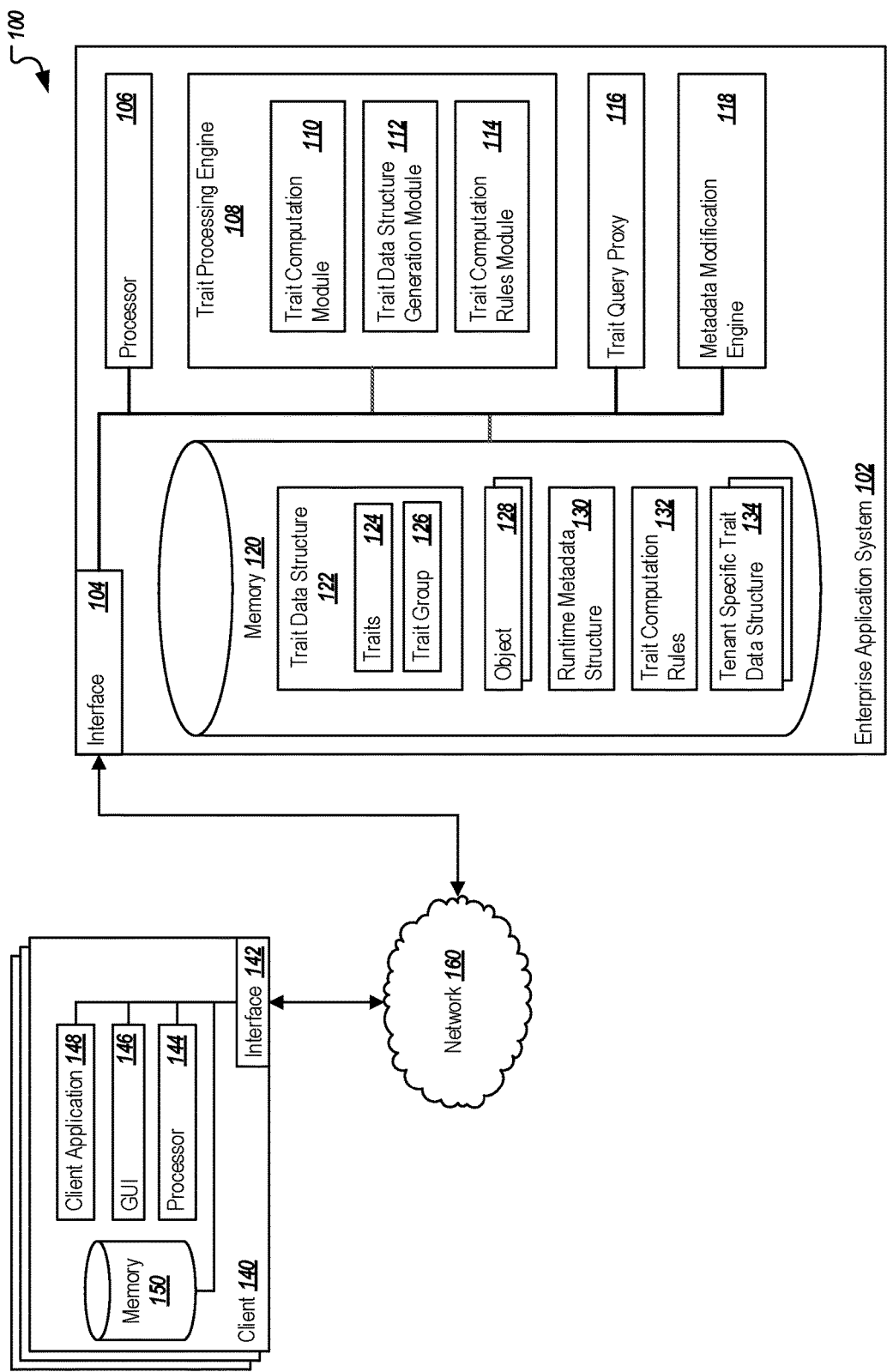
FIG. 1 is a block diagram illustrating an example system for identifying object traits.

The present disclosure describes systems and tools for dynamically identifying traits in an evolving domain model of an enterprise application on the cloud. A trait is a property or a characteristic of a class or an object (e.g., an instance of a class). Example traits may include "Editable," "Heavy," "Light," "Encryptable," "Vector Group," "Invoice," "Line Item," "Attachment," "Integration Enabled," "Internal," and "External," among others. In some instances, there are class level traits (e.g., traits that a class and any objects built or instantiated from the class will have) and object level traits (e.g., traits that an object has while a class the object is built or instantiated from does not have). An object may have the same class level traits from a class the object is built from (e.g., "Editable"). In addition, the object may have specific object level traits of its own (e.g., "Heavy"). In a large multi-tenant enterprise cloud environment supported by an object oriented programming language, there is a need to check whether an object has a specific trait or not (e.g., a query for whether object O has trait T). To identify traits of an object, the systems need to look through associated metadata of the object to determine the traits of the object. This disclosure describes a process to dynamically identify object traits in an evolving domain model of an enterprise application on the cloud.

The identification of traits of the object involves a computationally expensive traversal of the associated metadata of the object. When the object has more attributes, a graph of the associated metadata becomes larger. As a result, the traversal of the associated metadata becomes more computationally expensive. In addition, the object may need to be loaded and the associated metadata may need to be traversed every time a query for that object is received. This increases the response time to client queries. As the number of objects in a system increases, the number of trait queries may increase as well. In turn, this increases the system resources required for solving numerous trait queries, and as a result, reduces the productivity of the system.

This disclosure identifies operations for enabling fast trait identification by processing metadata structure of domain model (e.g., procurement, accounting, etc.) for each tenant in a multi-tenant cloud environment at the time of system bootstrap. The pre-computation operations create a trait data structure that includes trait groups which allow an O(1) and, at worst case, an O(log n) lookup for an application to determine whether an object under process has a specific trait or not. When a class has multiple traits (e.g., $T_1$ to $T_n$), every trait will be computed and the results will be stored in the trait data structure. In some instances, the pre-computation of the trait data structure can be asynchronous. In a multi-tenant environment, a common set of classes is provided by the application's domain system with an option to the tenants to enhance or modify the classes to suit their business needs and their enterprise resource planning (ERP) system. As the classes are evolved (e.g., modified), the corresponding traits are evolved (e.g., modified). The disclosed solution scales in such an evolving domain model specific to tenants, and performs trait query lookups at average complexity of O(1) and a worst case complexity of O(log n).

Compared to the computationally expensive traversal of the associated metadata described above, this disclosure provides a real-time solution. This solution does not necessitate traversing over a large metadata graph of an object model. By pre-computing trait groups at the time of system bootstrap and caching the trait groups, a faster response time is provided to client queries. This disclosure also provides isolation and sharing in a multi-tenant solution. Since the trait data structure is computed for various tenants in the system, the trait data structure can serve all tenants in real-time without looking up the metadata graph every time a query for that domain model is received. Restated, the proposed solution is a fast run-time solution providing responsive answers to trait queries in real-time. The system resources are used in an optimal manner without system slow down since the trait groups are computed at the time of system bootstrap. Further, modifications to the system can be immediately computed with the corresponding trait data structures being updated on-the-fly for further queries. The proposed solution is also scalable. As the number of objects, the number of fields in the objects, and/or the number of attributes per field increase, trait identification through the trait data structure does not get longer. It remains an O(1) and, at worst case, an O(log n) lookup operation for an application to determine whether an object under process has a specific trait or not.

Turning to the illustrated embodiment, FIG. 1 is a block diagram illustrating an example system 100 for identifying object traits. Specifically, the illustrated system 100 includes or is communicably coupled with an enterprise application system 102, client 140 (or clients 140), and a network 160. Although shown separately, in some implementations, functionality of two or more systems or servers may be provided by a single system or server. In some implementations, the functionality of one illustrated system or server may be provided by multiple systems or servers. Additionally, while illustrated as a client-server system, alternative implementations of the solution may be used to allow for client to client transfers, server-to-server transfers, and client- and/or server-to-cloud or other system transfers, as appropriate.

As used in the present disclosure, the term "computer" is intended to encompass any suitable processing device. For example, enterprise application system 102 may be any computer or processing device such as, a blade server, general-purpose personal computer (PC), Mac®, workstation, UNIX-based workstation, or any other suitable device. Moreover, although FIG. 1 illustrates enterprise application system 102 as a single system, enterprise application system 102 can be implemented using two or more systems, as well as computers other than servers, including a server pool. In other words, the present disclosure contemplates computers other than general-purpose computers, as well as computers without conventional operating systems. Further, illustrated enterprise application system 102 and client 140 may each be adapted to execute any operating system, including Linux, UNIX, Windows, Mac OS®, Java™ Android™, or iOS. According to one implementation, the illustrated systems may also include or be communicably coupled with a communication server, an e-mail server, a web server, a caching server, a streaming data server, and/or other suitable servers or computers.

In general, enterprise application system 102 may be any suitable computing server or system for running applications in response to requests (e.g., queries) for identifying object traits. The enterprise application system 102 is described herein in terms of responding to requests for identifying object traits from users at client 140 and other clients, as well as other systems communicably coupled to network 160 or directly connected to the enterprise application system 102. However, the enterprise application system 102 may, in some implementations, be a part of a larger system providing additional functionality. For example, enterprise application system 102 may be part of an enterprise business application or application suite providing one or more of enterprise relationship management, data management systems, customer relationship management, and others. In one example, for testing purposes, enterprise application system 102 may receive a request to identify whether an object has a specific trait, lookup a cached trait data structure to determine a result for the request, and respond to the request with the determined result. In some implementations, the enterprise application system 102 may be associated with a particular URL for web-based applications. The particular URL can trigger execution of a plurality of components and systems.

As illustrated, enterprise application system 102 includes an interface 104, a processor 106, a trait processing engine 108, a trait query proxy 116, a metadata modification engine 118, and memory 120. In general, the enterprise application system 102 is a simplified representation of one or more systems and/or servers that provide the described functionality, and is not meant to be limiting, but rather an example of the systems possible.

The interface 104 is used by the enterprise application system 102 for communicating with other systems in a distributed environment—including within the system 100—connected to the network 160 (e.g., client 140, and other systems communicably coupled to the network 160). The interface 104 may comprise logic encoded in software and/or hardware in a suitable combination and operable to communicate with the network 160 and the trait query proxy 116. More specifically, the interface 104 may comprise software supporting one or more communication protocols associated with communications, such that the network 160 or the trait query proxy 116 is operable to communicate physical signals with the interface 104 within and outside of the illustrated system 100.

Network 160 facilitates wireless or wireline communications between the components of the system 100 (e.g., between enterprise application system 102 and client 140 and among others), as well as with any other local or remote computer, such as additional clients, servers, or other devices communicably coupled to network 160, including those not illustrated in FIG. 1. In the illustrated system, the network 160 is depicted as a single network, but may be comprised of more than one network without departing from the scope of this disclosure, so long as at least a portion of the network 160 may facilitate communications between senders and recipients. In some instances, one or more of the illustrated components may be included within network 160 as one or more cloud-based services or operations. For example, the enterprise application system 102 may be cloud-based services. The network 160 may be all or a portion of an enterprise or secured network, while in another instance, at least a portion of the network 160 may represent a connection to the Internet. In some instances, a portion of the network 160 may be a virtual private network (VPN). Further, all or a portion of the network 160 can comprise either a wireline or wireless link. Example wireless links may include 802.11ac/ad,/af/a/b/g/n, 802.20, WiMax, LTE, and/or any other appropriate wireless link. In other words, the network 160 encompasses any internal or external network, networks, sub-network, or combination thereof operable to facilitate communications between various computing components inside and outside the illustrated system 100. The network 160 may communicate, for example, Internet Protocol (IP) packets, Frame Relay frames, Asynchronous Transfer Mode (ATM) cells, voice, video, data, and other suitable information between network addresses. The network 160 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the enterprise application system 102 includes a processor 106. Although illustrated as a single processor 106 in FIG. 1, two or more processors may be used according to particular needs, desires, or particular implementations of the system 100. Each processor 106 may be a central processing unit (CPU), an application-specific integrated circuit (ASIC), a field-programmable gate array (FPGA), or another suitable component. Generally, the processor 106 executes instructions and manipulates data to perform the operations of the enterprise application system 102. Specifically, the processor 106 executes the algorithms and operations described in the illustrated figures, including the operations performing the functionality associated with the enterprise application system 102 generally, as well as the various software modules (e.g., the trait data structure generation module 112), including the functionality for sending communications to and receiving transmissions from client 140.

The enterprise application system 102 also includes a trait processing engine 108. The trait processing engine 108 computes (or identifies) traits in a class (or an object). In operation, the trait processing engine 108 may access a class or an object in memory 120 (e.g., object 128), access a metadata structure for the class or the object in the memory 120 (e.g., runtime metadata structure 130), identify traits of the class or the object based on the metadata structure, and store the identified traits along with the corresponding class or the object (e.g., class id or object id) in the memory 120 (e.g., trait data structure 122). Operations of the trait processing engine 108 are executed by the processor 106. In some implementations, the trait processing engine 108 may be a software program, or set of software programs, executing on the enterprise application system 102. The trait processing engine 108 may also be an external component from the enterprise application system 102 and may communicate with the enterprise application system 102 over a network (e.g., network 160). In some implementations, trait processing engine 108 computes (or identifies) class level traits at system bootstrap time and object level traits when queried for the first time.

As shown, the trait processing engine 108 includes a trait computation module 110. The trait computation module 110 identifies traits of an object by performing the computationally expensive traversal of associated metadata of the object. In operation, the trait computation module 110 may identify traits of an object by looking through associated metadata for the object and performing the computationally expensive traversal of the metadata. In operation, the trait computation module 110 may receive a trait query (e.g., whether an object has a particular trait) from trait query proxy 116, access the object in object 128, access a metadata structure for the object in runtime metadata structure 130, traverse the metadata structure to determine whether the object has the particular trait (e.g., by applying a trait computation rule to generate a trait rule result), and respond to the trait query (e.g., respond with the trait rule result). In some implementations, the determination is stored in the trait data structure 122 for similar trait query in the future.

The trait processing engine 108 also includes a trait data structure generation module 112. The trait data structure generation module 112 may pre-compute trait groups (e.g., groups of classes that have the same class level trait) at the time of system bootstrap and store the trait groups in trait data structure 122. For example, at system bootstrap time, classes (e.g., base classes and tenant customized classes) are automatically loaded into the system. Metadata graphs are constructed when the classes are loaded. In operation, the trait data structure generation module 112 may identify a pre-defined set of object traits of interest (e.g., traits that client 140 is interested in), traverse metadata of a class when the metadata of the class is constructed, and store identified traits of the class in the trait data structure 122. For example, if the metadata of the class reveals that the class has trait $T_1$ (e.g., an entry in trait 124), then the trait data structure generation module 112 can add the class to trait group $TG_1$ (e.g., an entry in trait group 126 corresponding to the entry in trait 124). If the metadata of the class reveals that the class has trait $T_2$, then the trait data structure generation module 112 can also add the class to trait group $TG_2$. The trait data structure generation module 112 keeps building trait data structure 122 in memory 120 until all metadata for all classes are initialized in the system. As a result, the trait data structure generation module 112 only traverses class metadata once, and can identify all traits of interest (e.g., $T_1$ to $T_n$) that a class has (e.g., class level traits). In some implementations, objects may be loaded during system bootstrap time. The trait data structure generation module 112 may also identify object level traits that an object has and add the object to corresponding trait group in similar operations described above with respect to a class. In some implementations, the trait data structure generation module 112 may compute trait groups at system run-time. For example, when a tenant in a multi-tenant environment modifies or customizes a class at system run-time, the trait data structure generation module 112 may need to re-compute traits for the customized class at run-time and update trait data structure (e.g., tenant specific trait data structure 134) accordingly. The generated trait data structure 122 (and/or tenant specific trait data structure 134) can be used for trait identification, and provide fast trait query response since the trait query can be resolved within the trait data structure.

In the illustrated implementation, the trait processing engine 108 also includes a trait computation rules module 114. The trait computation rules module 114 may define rules (e.g., computations) that can be used to determine whether a class or an object has a particular trait. In operation, the trait computation rules module 114 may be called, for example, by the trait data structure generation module 112 to provide rules for identifying a particular trait. In some cases, the rules may be defined by client 140 or operators of the enterprise application system 102. In some implementations, the trait computation rules module 114 defines a hash table called trait computation rules specifying computations that have to be performed to decide whether a class or an object has a particular trait. For example, entries for trait "Encryptable" and "Heavy" may be the following:

Trait Name: Encryptable→Trait Rule: (if field type String and field attribute encryptable=true);

Trait Name: Heavy→Trait Rule: (if field type int and sum (field attribute size) for all fields in class>75).

The trait computation rules may be used to specify traits and rules that can compute the traits of an object or a class. The trait computation rules are extensible and new traits (and their corresponding rules) can be added to the hash table. In some implementations, the rules can be written as expressions based on ClassMeta, FieldMeta, and AttributeMeta structures. These expressions can be evaluated during the time when metadata is loaded.

As illustrated, enterprise application system 102 includes a trait query proxy 116. Since the trait data structure 122 may take time to initialize (e.g., complete), requests received before the trait data structure 122 is initialized may not be resolved by the trait data structure 122. To provide query response without waiting for the trait data structure 122 to complete initialization, the trait query proxy 116 can redirect the request to another component (e.g., trait computation module 110). In operation, the trait query proxy 116 may receive a trait query, determine whether the trait data structure has been initialized, send the trait query to the trait data structure 122 if the trait data structure 122 is initialized, and redirect the trait query to another component (e.g., trait computation module 110) if the trait data structure 122 is not initialized. In some implementations, the trait query proxy 116 may determine whether the trait data structure 122 has information to solve the trait query and redirect the trait query to another component based on the determination.

As illustrated, enterprise application system 102 also includes a metadata modification engine 118. The metadata modification engine 118 may provide traits re-computation at system runtime when a tenant customizes its object model. For example, the metadata modification engine 118 may recognize when a change to an object model is being made by a tenant. The change is applied to a metadata version of the object model for the particular tenant. The metadata modification engine 118 may hook trait computation into all metadata modification events. As soon as the metadata of the object model is modified in-memory, all traits of the object model are recomputed. In some implementations, trait query proxy 116 may be used to redirect requests while parts of the tenant specific trait data structure 134 are being changed.

Regardless of the particular implementation, "software" includes computer-readable instructions, firmware, wired and/or programmed hardware, or any combination thereof on a tangible medium (transitory or non-transitory, as appropriate) operable when executed to perform at least one of the processes and operations described herein. In fact, each software component may be fully or partially written or described in any appropriate computer language including C, C++, JavaScript, Java™, Visual Basic, assembler, Perl®, any suitable version of 4GL, as well as others.

As illustrated, enterprise application system 102 includes memory 120, or multiple memories 120. The memory 120 may include any memory or database module and may take the form of volatile or non-volatile memory including, without limitation, magnetic media, optical media, random access memory (RAM), read-only memory (ROM), removable media, or any other suitable local or remote memory component. The memory 120 may store various objects or data, including financial and/or business data, application information including URLs and settings, user information, behavior and access rules, administrative settings, password information, caches, backup data, repositories storing business and/or dynamic information, and any other appropriate information including any parameters, variables, algorithms, instructions, rules, constraints, or references thereto associated with the purposes of the trait processing engine 108 and/or the enterprise application system 102. Additionally, the memory 120 may store any other appropriate data, such as VPN applications, firmware logs and policies, firewall policies, a security or access log, print or other reporting files, as well as others. For example, illustrated memory 120 includes trait data structure 122, object 128, runtime metadata structure 130, trait computation rules 132, and tenant specific trait data structure 134.

The trait data structure 122 stores a pre-defined set of traits of interest (e.g., traits that client 140 is interested in) in traits 124. The trait group 126 stores groups of classes (e.g., class ids) that have the same class level trait. In some implementations, the trait group 126 may store groups of objects (e.g., object ids) that have the same object level trait. In some implementations, each trait group stored in the trait group 126, can be associated with a specific trait stored in the traits 124. Each trait group stored in the trait group 126 can be constructed as a heap, a list, and/or any other suitable structure. In some implementations, the trait data structure 122 stores a trait data structure that can identify traits for all base classes available to all tenants in a multi-tenant environment.

The object 128 (or objects 128) stores classes or objects that are loaded in the system. In some implementations, the classes or the objects are loaded automatically, for example, by a base server during the system bootstrap time. In some implementations, the classes or the objects are loaded when queries for the classes or the objects are received at system run-time. The runtime metadata structure 130 stores metadata of classes or objects (e.g., constructed by the base server) when the classes or the objects are loaded into object 128. The trait computation rules 132 stores rules that are used to identify traits. A trait computation rule may composed of expressions (or a strategy) that can be used to determine (or calculate) whether a class or an object has a particular trait. The trait computation rules 132 may be pre-defined and loaded during the system bootstrap time. In some implementations, the trait computation rules 132 may be modified by the trait computation rules module 114 at system run-time (e.g., when new traits are added).

The tenant specific trait data structure 134 stores tenant specific trait data structure for each tenant in a multi-tenant environment. A common set of classes may be available to every tenant. If a tenant uses the common set of classes without any customization, the tenant specific trait data structure 134 for the particular tenant may be the same as the trait data structure stored in the trait data structure 122. If the tenant modifies one or more classes in the common set of classes, traits for the modified classes need to be re-computed and the tenant specific trait data structure 134 for the particular tenant may be different than the trait data structure stored in the trait data structure 122. In some implementations, the trait data structures 134 for each tenant are pre-computed at the time of system bootstrap and stored in the tenant specific trait data structure 134.

Client 140 may be any computing device operable to connect to or communicate with enterprise application system 102, other clients (not illustrated), or other components via network 160, as well as with the network 160 itself, using a wireline or wireless connection, and can include a desktop computer, a mobile device, a tablet, a server, or any other suitable computer device. In general, client 140 comprises an electronic computer device operable to receive, transmit, process, and store any appropriate data associated with the system 100 of FIG. 1. In some instances, client 140 can be a particular thing within a group of the internet of things, such as a connected appliance or tool.

As illustrated, client 140 includes an interface 142, a processor 144, an optional graphical user interface (GUI) 146, a client application 148, and memory 150. Interface 142 and processor 144 may be similar to, or different than, the interface 104 and processor 106 described with regard to enterprise application system 102. In general, processor 144 executes instructions and manipulates data to perform the operations of the client 140. Specifically, the processor 144 can execute some or all of the algorithms and operations described in the illustrated figures, including the operations performing the functionality associated with the client application 148 and the other components of client 140. Similarly, interface 142 provides the client 140 with the ability to communicate with other systems in a distributed environment—including within the system 100—connected to the network 160.

Client 140 executes a client application 148. The client application 148 may operate with or without requests to the enterprise application system 102—in other words, the client application 148 may execute its functionality without requiring the enterprise application system 102 in some instances, such as by accessing data stored locally on the client 140. In others, the client application 148 may be operable to interact with the enterprise application system 102 by sending requests via network 160 to the enterprise application system 102 for identifying whether an object has a specific trait. In some implementations, the client application 148 may be a standalone web browser, while in others, the client application 148 may be an application with a built-in browser. The client application 148 can be a web-based application or a standalone application developed for the particular client 140. For example, the client application 148 can be a native iOS application for iPad, a desktop application for laptops, as well as others. In another example, the client application 148, where the client 140 is a particular thing (e.g., device) within a group of the internet of things, may be software associated with the functionality of the thing or device.

Memory 150 may be similar to or different from memory 120 of the enterprise application system 102. In general, memory 150 may store various objects or data, including any parameters, variables, algorithms, instructions, rules, constraints, or references thereto associated with the purposes of the client application 148 and/or client 140. Additionally, the memory 150 may store any other appropriate data, such as VPN applications, firmware logs and policies, firewall policies, a security or access log, print or other reporting files, as well as others.

The illustrated client 140 is intended to encompass any computing device such as a desktop computer, laptop/notebook computer, mobile device, smartphone, personal data assistant (PDA), tablet computing device, one or more processors within these devices, or any other suitable processing device. For example, the client 140 may comprise a computer that includes an input device, such as a keypad, touch screen, or other device that can accept user information, and an output device that conveys information associated with the operation of the client application 148 or the client 140 itself, including digital data, visual information, or a GUI 146, as shown with respect to the client 140. Further, while illustrated as a client system, client 140 may be exchanged with another suitable source for object traits identification in other implementations, and is not meant to be limiting.

While portions of the software elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2A:
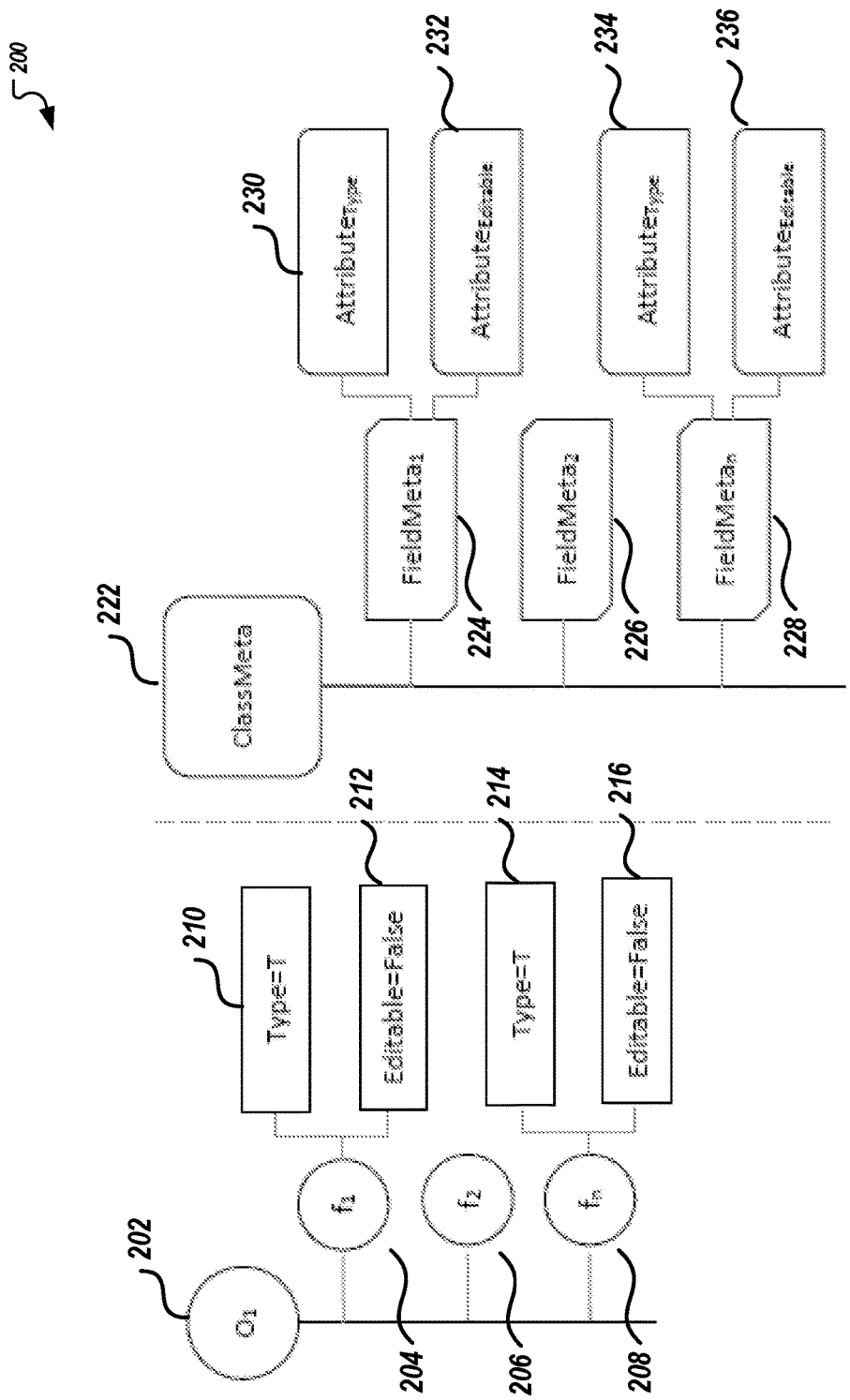
FIGS. 2A-2B are block diagrams illustrating associations between objects and their respective metadata.

FIG. 2A is a block diagram illustrating an association 200 between an object and its metadata. An object (or a class) may have fields, and the fields have attributes (e.g., type, size). The field type may be a primitive type (e.g., int, long) or a complex type (e.g., another class). Similarly, metadata for the object (or the class) may have a FieldMetadata for each field in the object (or the class), and each FieldMetadata may have AttributeMetadata.

As illustrated in FIG. 2A, an object $O_1$ 202 has n fields (i.e., $f_1$ 204, $f_2$ 206, to $f_n$ 208). Each field has attributes such as a type (e.g., type 210 and 214) and a Boolean property called "Editable" (e.g., Boolean 212 and 216). For example, "Editable" can be used in a graphics editor to determine whether an object (or a class) can be edited or not. In the metadata, the object $O_1$ 202 is represented by a ClassMeta 222. Each field's metadata is associated with a FieldMeta (e.g., $FieldMeta_1$ 224, $FieldMeta_2$ 226, to $FieldMeta_n$ 228). Each FieldMeta has AttributeMeta (e.g., 230, 232, 234, 236). To identify whether object $O_1$ 202 has a trait "Editable," the metadata data structure is traversed to check each field. If at least one field is found to be editable, then the object $O_1$ 202 is editable and as a result has a trait "Editable." In some implementations, "Editable" may be a class level trait. If a class is determined to have a class level trait (e.g., "Editable"), then any object built from the class will have that class level trait (e.g., "Editable"). Therefore, to identify a class level trait of an object, the class type of the object is determined first. If the class of the object does not have the class level trait, then the object is identified as not having the class level trait. If the class of the object does have the class level trait, then the object is identified as having the class level trait. In some implementations, class level trait identification is performed when the object model is loaded at the bootstrap time of the system.

Figure 2B:
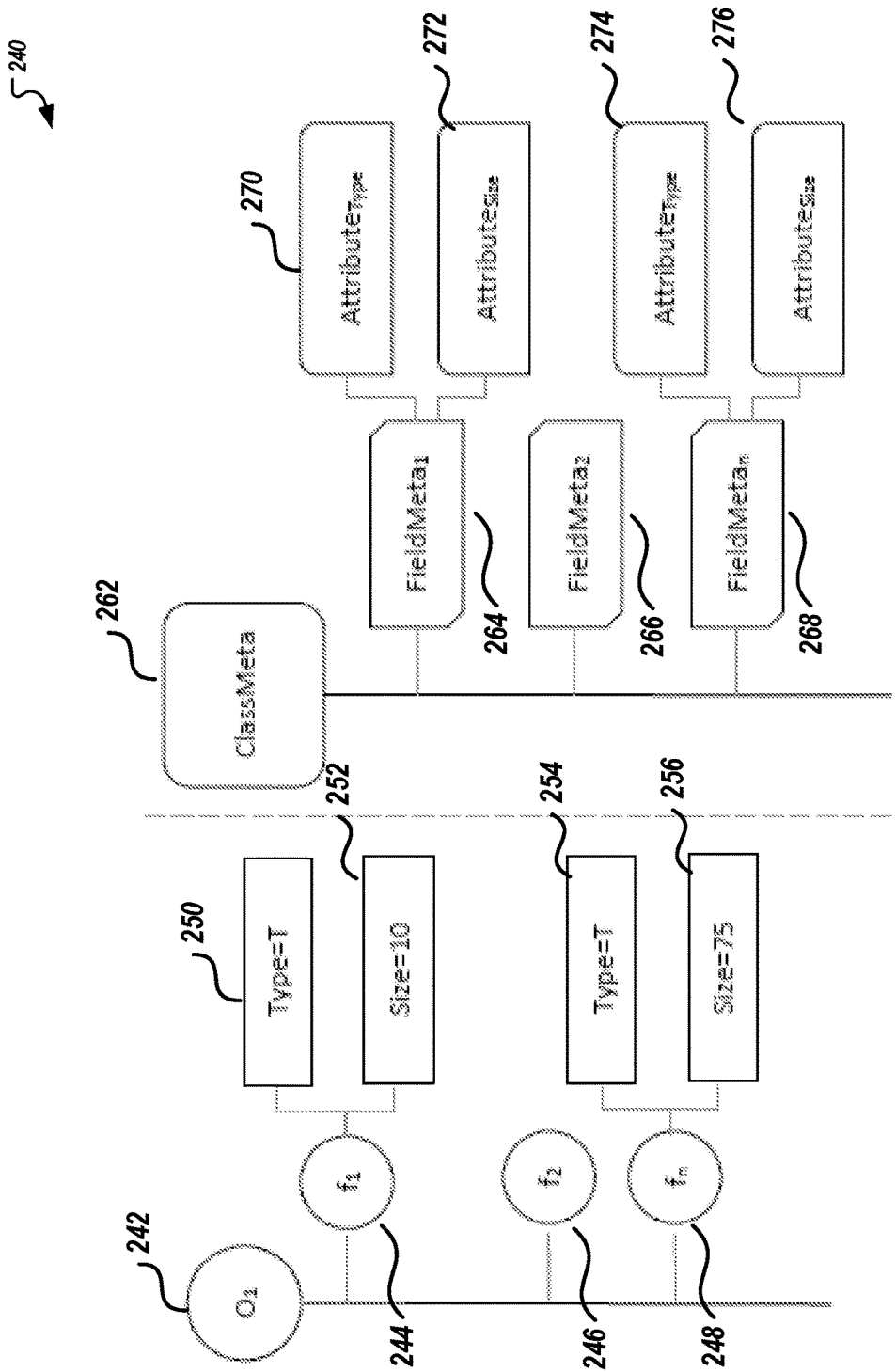

FIG. 2B is another block diagram illustrating an association 240 between an object and its metadata. As illustrated in FIG. 2B, an object $O_1$ 242 has n fields (i.e., $f_1$ 244, $f_2$ 246, to $f_n$ 248). Each field has attributes such as a type (e.g., type 250 and 254) and a property called "Size," indicating the size of value the field can store (e.g., size 252 and 256). In the associated metadata, the object $O_1$ 242 is represented by a ClassMeta 262. Each field's metadata is associated with a FieldMeta (e.g., $FieldMeta_1$ 264, $FieldMeta_2$ 266, to $FieldMeta_n$ 268). Each FieldMeta has AttributeMeta (e.g., 270, 272, 274, 276).

For a trait "Heavy" (e.g., large object size), if an object in an enterprise application has the "Heavy" trait, loading the entire object in memory may not be memory-efficient. Lazy loading the object only when requested may be better comparing to loading the entire object in memory. On the other hand, if an object in an enterprise application has a "Lightweight" trait (e.g., small object size), the entire object may be loaded in memory for fast request handling. To identify whether object $O_1$ 242 has a trait "Heavy," the metadata data structure is traversed to check each field and aggregate the field size. If the aggregated field size is greater than a constant, for example HEAVY_SIZE, then the object $O_1$ 242 is heavy and as a result has a trait "Heavy." In some implementations, "Heavy" may be an object level trait. If an object is determined to have an object level trait (e.g., "Heavy"), a class that the object is built from may not have that object level trait (e.g., "Heavy"). In some implementations, an object level trait may not be an appropriate trait for a class. Therefore, to identify an object level trait of an object, the class type of the object does not need to be determined. In some implementations, object level trait identification is performed lazily (e.g., the trait value is computed and stored the first time the question of a trait applicability is asked). A weak reference to the object is stored in the trait structure so that the applicability of the trait to only loaded objects in the system is maintained. In some implementations, object level trait identification is performed when the object is first reconstituted when loaded from the system. In some implementations, various traits may need to be calculated prior to the decision to be made, similar to "Heavy" and "Lightweight." As illustrated in FIG. 1, that calculation can be based on one or more trait computation rules 132 evaluated by the trait computation rules module 114.

For each trait in a pre-defined set of traits of interest, for example, stored in the trait data structure 122, whether the particular trait is applicable at the class or the object level may need to be determined. For example, as described above, a trait (e.g., "Heavy") that depends on actual values of an object is an object level trait and not a class level trait. A trait (e.g., "Editable") that does not depend on actual values of an object is a class level trait. When defining a trait of interest, methods to identify whether an object has the trait based on FieldMeta or ClassMeta of the object is also defined. An example implementation of a trait in the system is as follows:

```
Interface Trait {
    Boolean isClassLevelTrait( )
        {return false;}
    Boolean isObjectLevelTrait( )
        {return false;}
    hasTrait(FieldMeta)
        {return false;}
    hasTrait(ClassMeta)
        {return false;}
}
EditableTrait implements Trait {
    private Boolean editable;
    Boolean isClassLevelTrait( )
        {return true;}
    hasTrait(FieldMeta) {
        return editable;
    }
    hasTrait(ClassMeta) {
        iterate over all fieldmeta f in the class
        {
            if( hasTrait(f) ){ return true}
        }
    }
}
```

As described above, to identify trait "Heavy," all field size in the metadata are aggregated. Performing such expensive computations each time the identification is required is not scalable (or optimal) in a multi-tenant shared computing system. The disclosed solution performs the expensive computations only once at bootstrap time (or at run-time when the object level trait is requested for the first time). As a result, queries for traits of an object can be answered quickly by performing a search within a cached trait data structure instead of traversing the metadata of the object.

Figure 3:
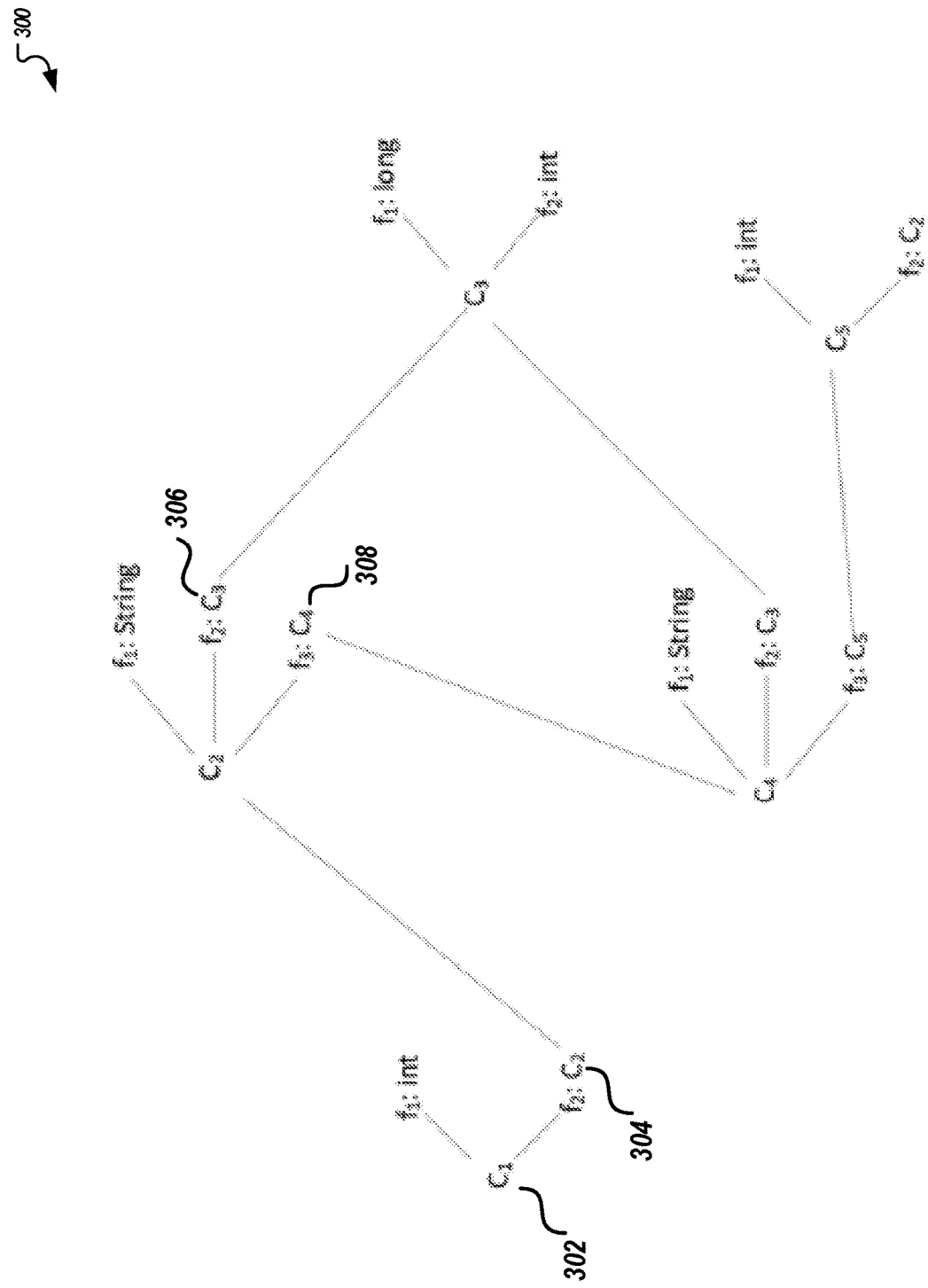
FIG. 3 is an example metadata graph of an example class.

FIG. 3 is an example metadata graph 300 of an example class. As illustrated in FIG. 3, metadata graphs may be large and complicated. For example, a class $C_1$ 302 has a field $f_2$, which has a complex type $C_2$ 304. Class $C_2$ has a field $f_2$ with a complex types $C_3$ 306 and a field $f_3$ with a complex types $C_4$ 308. To answer trait queries for an object which belongs to class $C_1$, the metadata graph 300 needs to be traversed to check each field and/or aggregate each field size. The disclosed solution describes an algorithm and data structure for modeling and solving this trait identification problem in a multi-tenant shared computing system. The proposed solution creates an in-memory data structure that can answer the question of whether or not an object O has a trait T in O(1) time.

Figure 4:
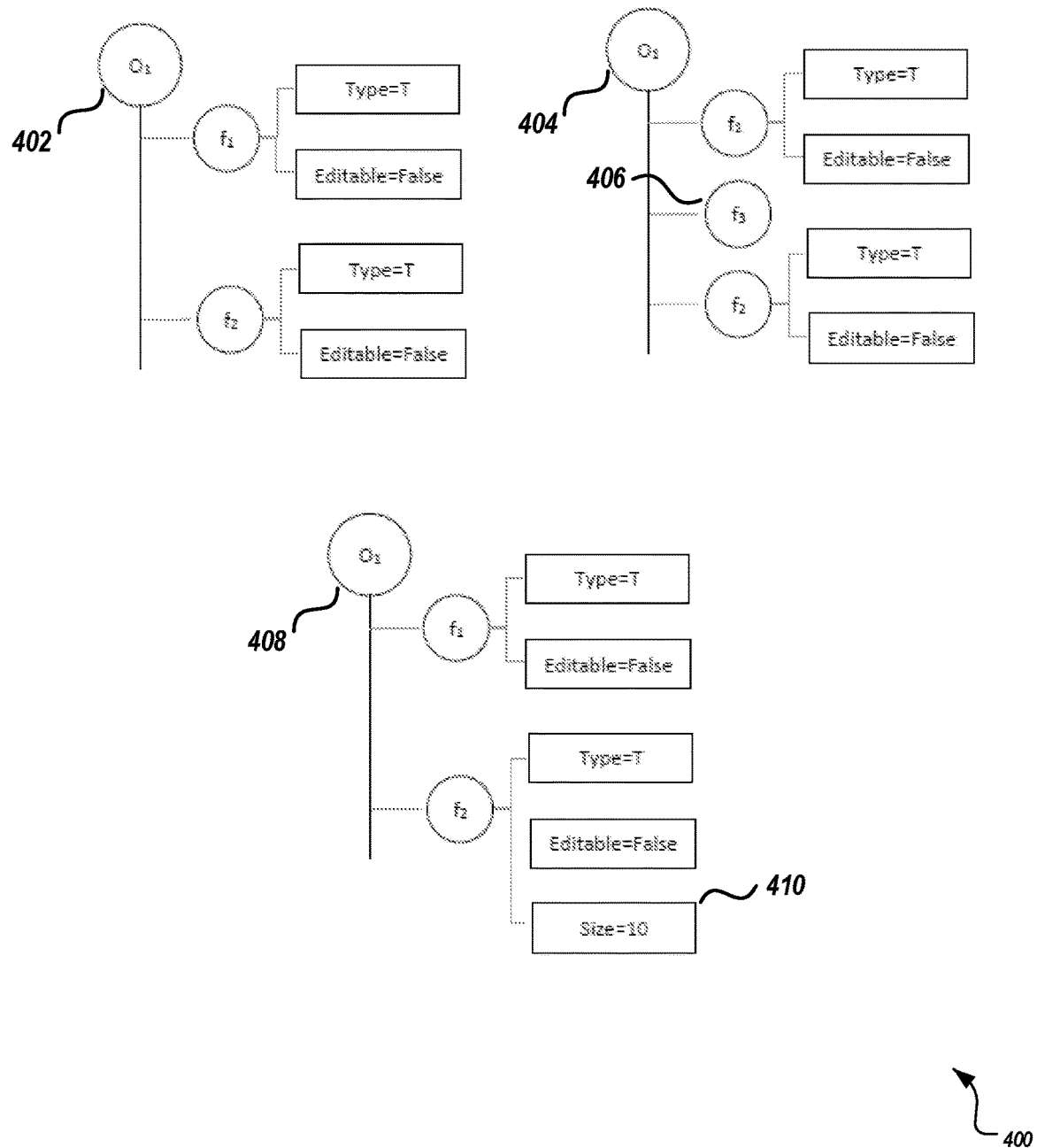
FIG. 4 is a set of diagrams illustrating customization of an example object.

FIG. 4 is a set of diagram illustrating customization 400 of an example object. In a multi-tenant enterprise cloud system, object models can be shared by every tenant. In addition, various tenants can modify or customize some object models to suit their business needs and their ERP system. For example, as illustrated in FIG. 4, a single object $O_1$ is shared by all tenants. The first version of $O_1$ 402 is the out of box "plain" version that is the same for every tenant. The first version of $O_1$ 402 has two fields, $f_1$ and $f_2$. Each field has two attributes, a type and a Boolean property called "Editable." The second version of $O_1$ 404 is one that is customized by tenant$_1$ according to its business need. The customization includes a new field $f_3$ 406. The third version of $O_1$ 408 is one that is customized by tenant$_2$ according to its business need. The customization includes a new attribute 410 (e.g., "Size" with a value of 10) to field $f_2$.

The object customization may be performed at system run-time and, as a result, the trait data structure has to be adjusted accordingly during run-time. The disclosed solution solves the problem of evolving object models by using a metadata modification hook system (e.g., metadata modification engine 118). For example, when a tenant customizes its object model at runtime, the metadata modification hook system recognizes that a change is being made. The change is applied to the metadata version for the particular tenant. The trait computation is hooked into all metadata modification events. As soon as the metadata of the object model is modified in-memory, all traits of the object model are recomputed. In case some lookups to the tenant specific trait data structure fail while parts of the data structure are being changed, the trait query proxy 116 can redirect trait queries to another component (e.g., trait computation module 110) to perform the expensive trait computation base on metadata. The computation result will be added to trait data structures for solving future trait queries. Since customizations are rare, the re-computation may not be expensive in the proposed solution.

Figure 5:
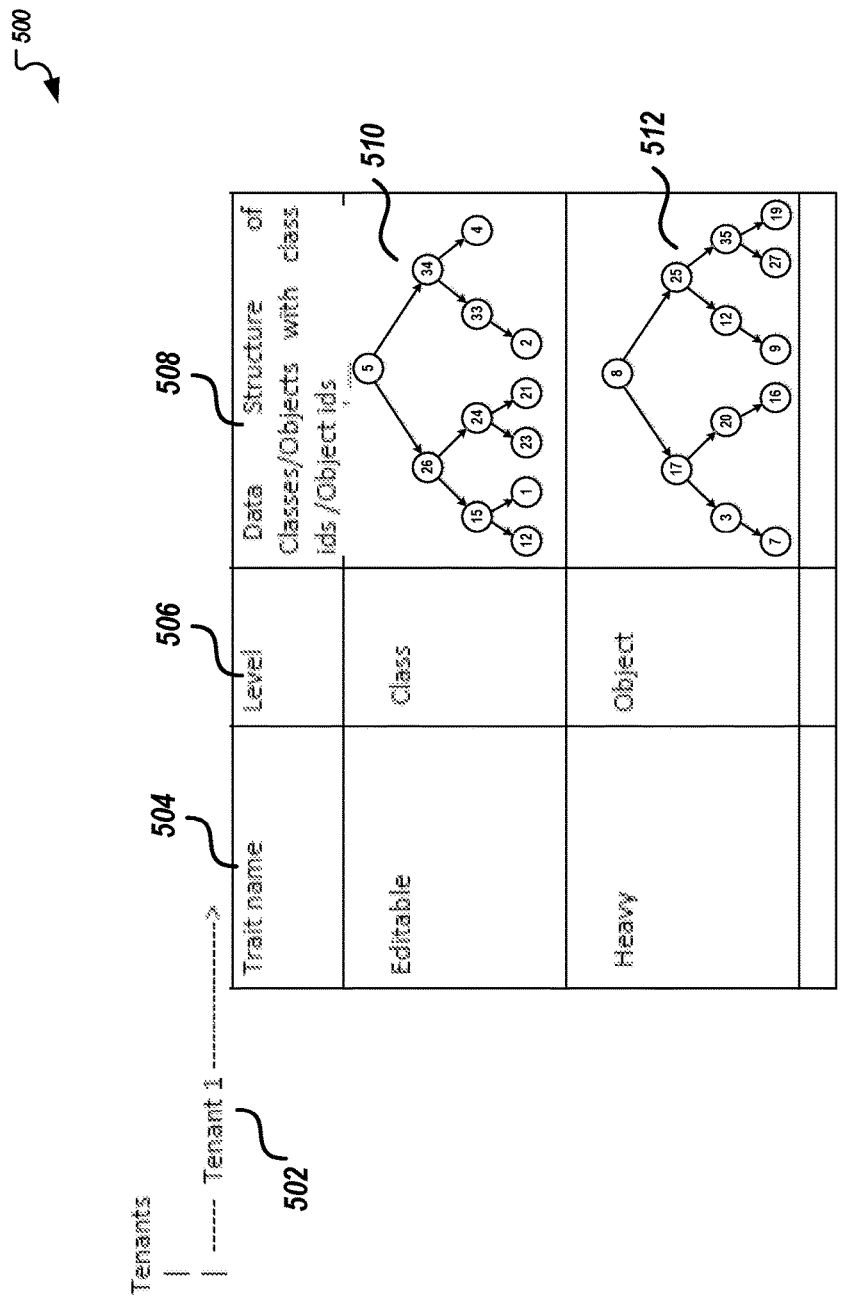
FIG. 5 is a table showing an example trait data structure.

FIG. 5 is a table showing an example trait data structure 500. On a node in a multi-tenant system, several variants of the object model are loaded. For example base object model (e.g., common class), tenant$_1$ object model, tenant$_2$ object model, and other tenant object models are loaded. On each node in the multi-tenant system, only a few of the tenants are loaded. When a particular node is started, the base domain variant (e.g., the base object model) is loaded. As each class is loaded, the class level traits are identified and classes are marked as having the specific traits. In addition, the object model of the tenants is loaded. All the classes which are modified in the tenant specific object model are rechecked, and trait validity on these classes specific to the tenants is identified in the modified object model specific to the tenants.

As illustrated in FIG. 5, the trait data structure 500 includes a trait data structure specifically for tenant$_1$ 502. The tenant$_1$ trait data structure includes trait name 504, level 506, and trait group 508. The data structure shown in the trait group 508 is a class or object structure based on whether the corresponding trait is class level or object level trait. For example, data structure 510 is a class level structure containing class IDs and data structure 512 is an object level structure containing object IDs. As illustrated in FIG. 5, the data structure is a balanced heap, which provides an amortized worst case run-time of O (log n). The heap 510 indicates that all classes (e.g., class 5, class 26, class 34) in the heap 510 have a class level trait "Editable." The heap 512 indicates that all objects (e.g., object 8, object 17, object 25) in the heap 512 have an object level trait "Heavy." In some implementations, other data structures may be used to implement data structure in trait group 508 (e.g., list). Each object in the heap 512 is a weak reference (e.g., a phantom reference in Java™) to the object loaded in memory. When the object is deleted from the memory, the corresponding reference is removed from the trait data structure as well.

Figure 6A:
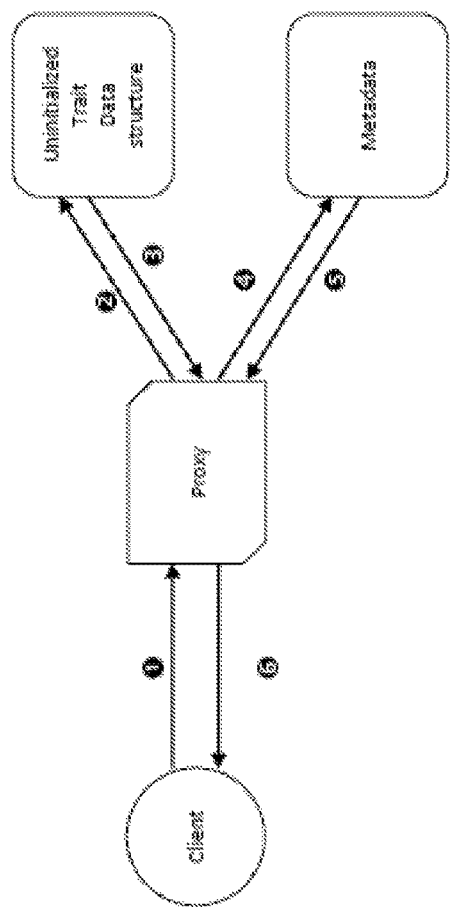
FIGS. 6A-6C are diagrams illustrating example operations of a proxy handling a trait query.

FIG. 6A is a diagram illustrating example operations 600 of a proxy handling a trait query. In some implementations, the proxy may be the trait query proxy 116 described in FIG. 1. FIG. 6A shows the scenario where the trait data structure is not initialized yet. In some implementations, the trait data structure is initialized but does not contain information to answer the trait query (e.g. the trait query is for an object level query). A sequence of events starts with the client making a trait lookup request (i.e., event 1). The request goes to the proxy. The proxy attempts to lookup the trait data structure (i.e., event 2). The trait data structure is not initialized yet and informs the proxy about the uninitialized state (i.e., event 3). The proxy then performs the computation on the metadata directly (i.e., event 4), generates an answer to the query (i.e., event 5), and responds to the client (i.e., event 6). In some implementations, the proxy redirects the trait query to other components (e.g., trait computation module 110) to perform the expensive computation on the metadata (i.e., event 4).

Figure 6B:
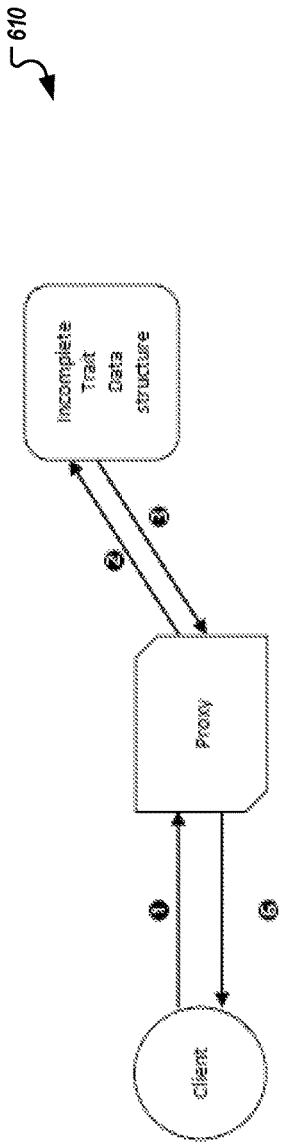

FIG. 6B is another diagram illustrating example operations 610 of a proxy handling a trait query (e.g., whether object O has trait T). FIG. 6B shows the scenario where the trait data structure is not initialized yet. However, the trait and the object that are being queried are present in the trait data structure (e.g., the trait data structure has the information to answer the trait query). A sequence of events starts with the client making a trait lookup request (i.e., event 1). The request goes to the proxy. The proxy attempts to lookup the trait data structure (i.e., event 2). The trait data structure is not initialized yet. However, the trait data structure is able to find, for example, object O has trait T base on partially initialized trait data structure request and returns the result to the proxy (i.e., event 3). The proxy then responds to the client with the result (i.e., event 6). If the incomplete trait data structure was not able to identify the trait, a similar process of FIG. 6A (i.e., event 4 and event 5) where the metadata is analyzed directly by the proxy will be performed.

Figure 6C:
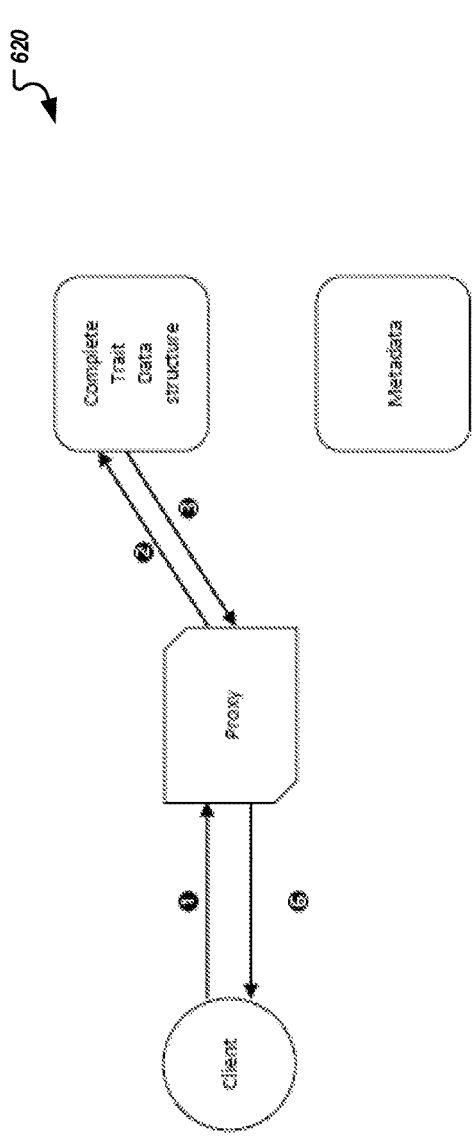

FIG. 6C is another diagram illustrating example operations 620 of a proxy handling a trait query. FIG. 6C shows the scenario where the trait data structure is fully initialized. A sequence of events starts with the client making a trait lookup request (i.e., event 1). The request goes to the proxy. The proxy attempts to lookup the trait data structure (i.e., event 2). The trait data structure is fully initialized and returns the query result to the proxy (i.e., event 3). The proxy then responds to the client with the result (i.e., event 6). In some implementations, when receiving a trait query from a particular tenant in a multi-tenant enterprise cloud system, the proxy may attempt to lookup the trait data structure for the particular tenant (e.g., trait data structure stored in tenant specific trait data structure 134).

Figure 7:
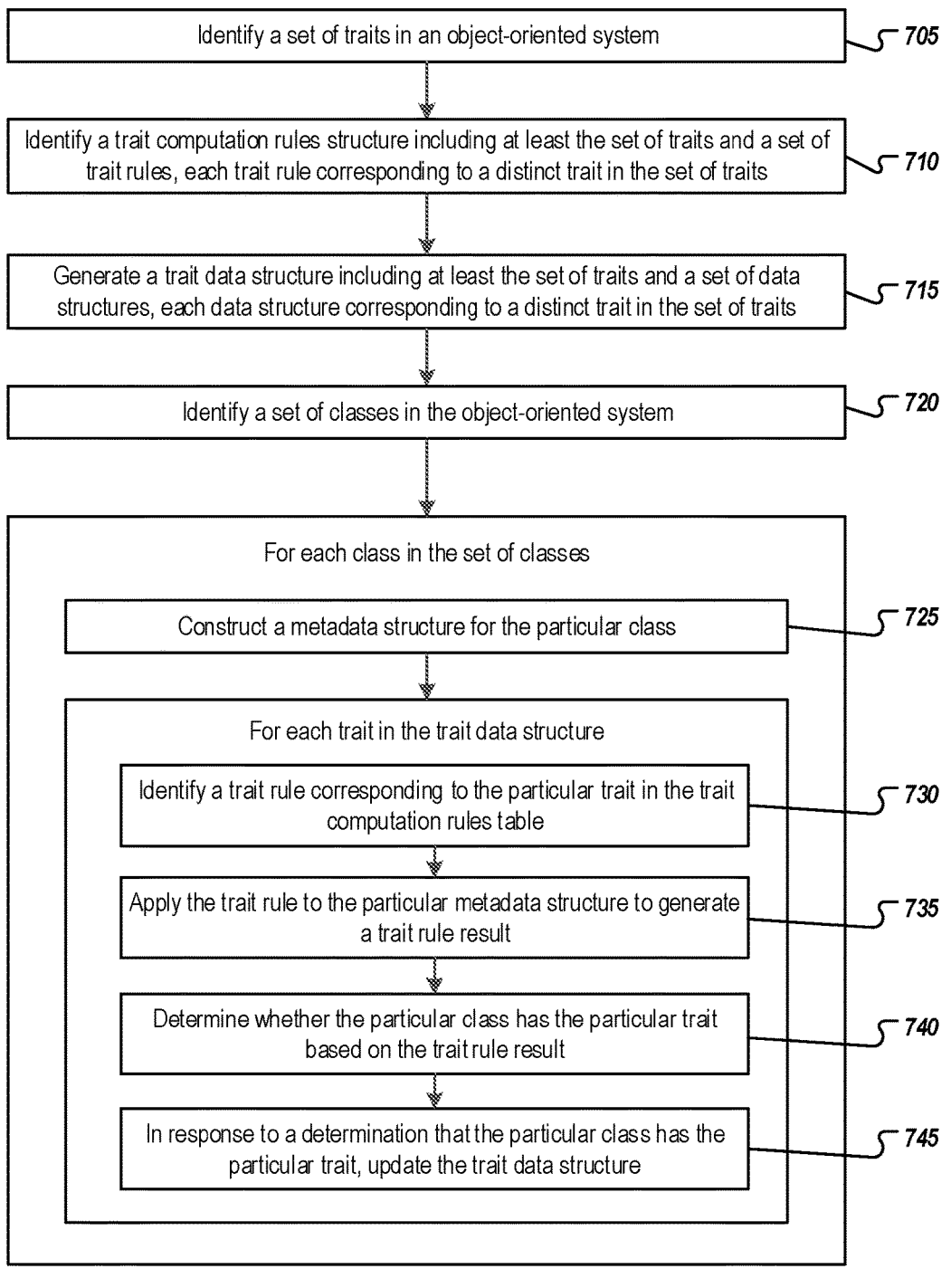
FIG. 7 is a flowchart of an example method for identifying object traits.

FIG. 7 is a flowchart of an example method 700 for identifying object traits. It will be understood that method 700 and related methods may be performed, for example, by any suitable system, environment, software, and hardware, or a combination of systems, environments, software, and hardware, as appropriate. For example, one or more of a client, a server, or other suitable computing device can be used to execute method 700 and related methods and obtain any data from the memory of a client, the server, or the other computing device. In some implementations, the method 700 and related methods are executed by one or more components of the system 100 described above with respect to FIG. 1. For example, the method 700 and related methods can be executed by the enterprise application system 102 of FIG. 1.

At 705, a set of traits is identified. The set of traits includes class level traits and/or object level traits. In some cases, the set of traits includes at least one of editable, heavy, light, encryptable, vector group, invoice, line item, attachment, integration enabled, internal, or external, although any number of alternative and/or additional traits may be included (e.g., any object properties as per the needs of an application). The set of traits is predefined before system bootstrap time. In some implementations, the set of traits can be defined or modified at system run-time.

At 710, a trait computation rules structure is identified. The trait computation rules structure includes a set of trait rules. Each trait rule is composed of expressions (or a strategy) and corresponds to a distinct trait in the set of traits. In some implementations, trait rule can be an expression or equation that can be used to determine (or calculate) whether a class or an object has a particular trait. The trait computation rules structure is predefined with the set of traits before system bootstrap time. In some implementations, the trait computation rules structure can be defined or modified at system run-time.

At 715, a trait data structure is generated. In some cases, the trait data structure includes at least the set of traits and a set of data structures. Each data structure corresponds to a distinct trait in the set of traits and can be a heap, a skip list, or any other suitable structure. In some implementations, the trait data structure is a hash table with hash keys as traits (e.g., the set of traits) and hash values as heaps (e.g., the set of data structures) containing class or object IDs. In some implementations, the trait data structure includes class level traits, but not object level traits, from the set of traits.

At 720, a set of classes is identified. In some implementations, a set of objects is also identified. For each class in the set of classes, the following operations are performed. At 725, a metadata structure for the particular class is constructed. For each trait in the trait data structure, the following operations are performed.

At 730, a trait rule corresponding to the particular trait in the trait computation rules structure is identified. In some implementations, the trait rule specifies computations that have to be performed to decide whether a class or an object has the particular trait. At 735, the trait rule is applied to the particular metadata structure to generate a trait rule result. At 740, whether the particular class has the particular trait is determined based on the trait rule result.

At 745, in response to a determination that the particular class has the particular trait, the trait data structure is updated. The updated trait data structure indicates that the particular class has the particular trait. In some implementations, the trait data structure is updated by adding the particular class to a data structure corresponding to the particular trait in the trait data structure. In some implementations, the trait data structure is updated by changing a previously indicated trait value with a newly computed trait value. In some implementations, the trait data structure is updated during system bootstrap time. In some implementations, the trait data structure is updated during system run-time.

In some implementations, further operations for identifying object traits (not shown in FIG. 7) can be optionally performed. For example, a trait lookup query is received. The trait lookup query includes a trait and an object. Whether the trait data structure has information to solve the trait lookup query is determined. In response to a determination that the trait data structure has the information to solve the trait lookup query, a trait lookup query response is generated based on the trait data structure. On the other hand, in response to a determination that the trait data structure does not have the information to solve the trait lookup query, a trait lookup query response is generated based on a metadata structure for the object. In some implementations, the trait data structure is updated according to the trait lookup query response generated based on the metadata structure for the object. The trait lookup query response indicates that the object has the trait or the object does not have the trait.

Additional process actions (not shown in FIG. 7) may be added to extend the functionalities of the example method to a multi-tenant system. For example, a set of tenants in the multi-tenant system is identified. For each tenant in the set of tenants, the following operations are performed. A tenant trait data structure is generated for the particular tenant. The particular tenant trait data structure is a copy of the trait data structure. A set of modified classes by the particular tenant is identified. For each modified class in the particular set of modified classes, the following operations are performed. A metadata structure for the particular modified class is constructed. For each trait in the tenant trait data structure, the following operations are performed. A trait rule corresponding to the particular trait in the trait computation rules structure is identified. The trait rule is applied to the particular metadata structure to generate a trait rule result. Whether the particular modified class has the particular trait based on the trait rule result is determined. In response to a determination that the particular modified class has the particular trait, the tenant trait data structure is updated. The updated tenant trait data structure indicates that the particular modified class has the particular trait.

The following example pseudocode illustrates an example object traits identification process.

```
traitsList = get list of all traits required;
// Compute Traits list for common class structure
classMetaList = get list of all classes in the system;
For each ClassMeta in classMetaList
    Build metadata structure;
    fieldsMetaList = get list of all fields in the
        class;
    For each FieldMeta in fieldsMetaList
        Build metadata structure;
        Get Attributes of field;
        For each trait in traitsList
            Compute if field has trait;
            If positive match then
                Add to trait data structure for
                    common meta;
            EndIf
```

```
        EndFor
    EndFor
EndFor
// Trait structure for the common class model is ready
at this stage
// Now create the trait structure for any variantized
classes for specific tenants
tenantList = get list of all tenants in the system;
For each tenant in tenantList
    tenantModifiedClassesList = Get List of all
        modified classes for this tenant;
    For each ModifiedClass in
    tenantModifiedClassesList
        For each ClassMeta in ModifiedClass
            Build metadata structure;
            fieldsMetaList = get list of all
                modified fields in the class;
            For each FieldMeta in fieldsMetaList
                Build metadata structure;
                Get Attributes of field;
                For each trait in traitsList
                    Compute if field has trait;
                    If positive match then
                        Add to trait data
                            structure for tenant;
                    EndIf
                EndFor
            EndFor
        EndFor
    EndFor
EndFor
```

Alternative methods of identifying object traits may be used in other implementations. Those described herein are examples and are not meant to be limiting.

Described implementations of the subject matter can include one or more features, alone or in combination.

For example, in a first implementation, a computer-implemented method includes identifying a set of traits in an object-oriented system, each trait representing a characteristic of an object in the object-oriented system; identifying a trait computation rules structure, the trait computation rules structure including a set of trait rules, each trait rule corresponding to a distinct trait in the set of traits; generating a trait data structure for the object-oriented system, the trait data structure including at least the set of traits and a set of data structures, each data structure corresponding to a distinct trait in the set of traits; identifying a set of classes in the object-oriented system; and for each class in the set of classes: constructing a metadata structure for the particular class; and for each trait in the trait data structure: identifying a trait rule corresponding to the particular trait in the trait computation rules structure; applying the trait rule to the particular metadata structure to generate a trait rule result; determining whether the particular class has the particular trait based on the trait rule result; and in response to a determination that the particular class has the particular trait, updating the trait data structure, the updated trait data structure indicating that the particular class has the particular trait.

The foregoing and other described implementations can each optionally include one or more of the following features:

A first feature, combinable with any of the following features, comprising receiving a trait lookup query, the trait lookup query including a trait and an object, the object being an instance of a class; determining whether the trait data structure has information to solve the trait lookup query; and in response to a determination that the trait data structure has the information to solve the trait lookup query, generating a trait lookup query response based on the trait data structure, the trait lookup query response indicating that the object has the trait or the object does not have the trait.

A second feature, combinable with any of the previous or following features, comprising in response to a determination that the trait data structure does not have the information to solve the trait lookup query, generating a trait lookup query response based on a metadata structure for the object, the trait lookup query response indicating that the object has the trait or the object does not have the trait.

A third feature, combinable with any of the previous or following features, comprising updating the trait data structure, the updated trait data structure indicating the object has the trait or the object does not have the trait.

A fourth feature, combinable with any of the previous or following features, wherein the object-oriented system is a multi-tenant system, comprising identifying a set of tenants in the object-oriented system; and for each tenant in the set of tenants: generating a tenant trait data structure for the particular tenant, the particular tenant trait data structure being a copy of the trait data structure; identifying a set of modified classes by the particular tenant; and for each modified class in the particular set of modified classes: constructing a metadata structure for the particular modified class; and for each trait in the tenant trait data structure: identifying a trait rule corresponding to the particular trait in the trait computation rules structure; applying the trait rule to the particular metadata structure to generate a trait rule result; determining whether the particular modified class has the particular trait based on the trait rule result; and in response to a determination that the particular modified class has the particular trait, updating the tenant trait data structure, the updated tenant trait data structure indicating that the particular modified class has the particular trait.

A fifth feature, combinable with any of the previous or following features, wherein the set of traits includes at least one of heavy, light, encryptable, or editable.

A sixth feature, combinable with any of the previous or following features, wherein each data structure in the trait data structure is a heap.

A seventh feature, combinable with any of the previous or following features, wherein updating the trait data structure includes adding the particular class to a data structure corresponding to the particular trait in the trait data structure.

A eighth feature, combinable with any of the previous or following features, wherein the trait data structure is generated and updated during bootstrap time of the object-oriented system.

A ninth feature, combinable with any of the previous or following features, wherein the set of traits includes at least one of class level traits or object level traits, and the trait data structure is updated during run-time of the object-oriented system for the object level traits.

In a second implementation, a computer program product comprising computer-readable instructions, which, when loaded and executed on a computer system, cause the computer system to perform operations comprising: identifying a set of traits in an object-oriented system, each trait representing a characteristic of an object in the object-oriented system; identifying a trait computation rules structure, the trait computation rules structure including a set of trait rules, each trait rule corresponding to a distinct trait in the set of traits; generating a trait data structure for the object-oriented system, the trait data structure including at least the set of traits and a set of data structures, each data structure corresponding to a distinct trait in the set of traits; identifying a set of classes in the object-oriented system; and for each class in the set of classes: constructing a metadata structure for the particular class; and for each trait in the trait data structure: identifying a trait rule corresponding to the particular trait in the trait computation rules structure; applying the trait rule to the particular metadata structure to generate a trait rule result; determining whether the particular class has the particular trait based on the trait rule result; and in response to a determination that the particular class has the particular trait, updating the trait data structure, the updated trait data structure indicating that the particular class has the particular trait.

The foregoing and other described implementations can each optionally include one or more of the following features:

A first feature, combinable with any of the following features, comprising receiving a trait lookup query, the trait lookup query including a trait and an object, the object being an instance of a class; determining whether the trait data structure has information to solve the trait lookup query; and in response to a determination that the trait data structure has the information to solve the trait lookup query, generating a trait lookup query response based on the trait data structure, the trait lookup query response indicating that the object has the trait or the object does not have the trait.

A second feature, combinable with any of the previous or following features, comprising in response to a determination that the trait data structure does not have the information to solve the trait lookup query, generating a trait lookup query response based on a metadata structure for the object, the trait lookup query response indicating that the object has the trait or the object does not have the trait.

A third feature, combinable with any of the previous or following features, comprising updating the trait data structure, the updated trait data structure indicating the object has the trait or the object does not have the trait.

A fourth feature, combinable with any of the previous or following features, wherein the object-oriented system is a multi-tenant system, comprising identifying a set of tenants in the object-oriented system; and for each tenant in the set of tenants: generating a tenant trait data structure for the particular tenant, the particular tenant trait data structure being a copy of the trait data structure; identifying a set of modified classes by the particular tenant; and for each modified class in the particular set of modified classes: constructing a metadata structure for the particular modified class; and for each trait in the tenant trait data structure: identifying a trait rule corresponding to the particular trait in the trait computation rules structure; applying the trait rule to the particular metadata structure to generate a trait rule result; determining whether the particular modified class has the particular trait based on the trait rule result; and in response to a determination that the particular modified class has the particular trait, updating the tenant trait data structure, the updated tenant trait data structure indicating that the particular modified class has the particular trait.

A fifth feature, combinable with any of the previous or following features, wherein the set of traits includes at least one of heavy, light, encryptable, or editable.

A sixth feature, combinable with any of the previous or following features, wherein each data structure in the trait data structure is a heap.

A seventh feature, combinable with any of the previous or following features, wherein updating the trait data structure includes adding the particular class to a data structure corresponding to the particular trait in the trait data structure.

A eighth feature, combinable with any of the previous or following features, wherein the trait data structure is generated and updated during bootstrap time of the object-oriented system.

A ninth feature, combinable with any of the previous or following features, wherein the set of traits includes at least one of class level traits or object level traits, and the trait data structure is updated during run-time of the object-oriented system for the object level traits.

In some implementations, the computer program product can be implemented on a non-transitory, computer-readable medium storing one or more instructions executable by a computer system to perform the above-described operations.

In a third implementation, a computer system, comprising: one or more processors; and a computer-readable medium storing instructions executable by the one or more processors to perform operations comprising: identifying a set of traits in an object-oriented system, each trait representing a characteristic of an object in the object-oriented system; identifying a trait computation rules structure, the trait computation rules structure including a set of trait rules, each trait rule corresponding to a distinct trait in the set of traits; generating a trait data structure for the object-oriented system, the trait data structure including at least the set of traits and a set of data structures, each data structure corresponding to a distinct trait in the set of traits; identifying a set of classes in the object-oriented system; and for each class in the set of classes: constructing a metadata structure for the particular class; and for each trait in the trait data structure: identifying a trait rule corresponding to the particular trait in the trait computation rules structure; applying the trait rule to the particular metadata structure to generate a trait rule result; determining whether the particular class has the particular trait based on the trait rule result; and in response to a determination that the particular class has the particular trait, updating the trait data structure, the updated trait data structure indicating that the particular class has the particular trait.

The foregoing and other described implementations can each optionally include one or more of the following features:

A first feature, combinable with any of the following features, comprising receiving a trait lookup query, the trait lookup query including a trait and an object, the object being an instance of a class; determining whether the trait data structure has information to solve the trait lookup query; and in response to a determination that the trait data structure has the information to solve the trait lookup query, generating a trait lookup query response based on the trait data structure, the trait lookup query response indicating that the object has the trait or the object does not have the trait.

A second feature, combinable with any of the previous or following features, comprising in response to a determination that the trait data structure does not have the information to solve the trait lookup query, generating a trait lookup query response based on a metadata structure for the object, the trait lookup query response indicating that the object has the trait or the object does not have the trait.

A third feature, combinable with any of the previous or following features, comprising updating the trait data structure, the updated trait data structure indicating the object has the trait or the object does not have the trait.

A fourth feature, combinable with any of the previous or following features, wherein the object-oriented system is a multi-tenant system, comprising identifying a set of tenants in the object-oriented system; and for each tenant in the set of tenants: generating a tenant trait data structure for the particular tenant, the particular tenant trait data structure being a copy of the trait data structure; identifying a set of modified classes by the particular tenant; and for each modified class in the particular set of modified classes: constructing a metadata structure for the particular modified class; and for each trait in the tenant trait data structure: identifying a trait rule corresponding to the particular trait in the trait computation rules structure; applying the trait rule to the particular metadata structure to generate a trait rule result; determining whether the particular modified class has the particular trait based on the trait rule result; and in response to a determination that the particular modified class has the particular trait, updating the tenant trait data structure, the updated tenant trait data structure indicating that the particular modified class has the particular trait.

A fifth feature, combinable with any of the previous or following features, wherein the set of traits includes at least one of heavy, light, encryptable, or editable.

A sixth feature, combinable with any of the previous or following features, wherein each data structure in the trait data structure is a heap.

A seventh feature, combinable with any of the previous or following features, wherein updating the trait data structure includes adding the particular class to a data structure corresponding to the particular trait in the trait data structure.

A eighth feature, combinable with any of the previous or following features, wherein the trait data structure is generated and updated during bootstrap time of the object-oriented system.

A ninth feature, combinable with any of the previous or following features, wherein the set of traits includes at least one of class level traits or object level traits, and the trait data structure is updated during run-time of the object-oriented system for the object level traits.

The preceding figures and accompanying descriptions illustrate example systems, processes, and computer-implementable techniques. While the illustrated systems and processes contemplate using, implementing, or executing any suitable technique for performing these and other tasks, it will be understood that these systems and processes are for illustration purposes only and that the described or similar techniques may be performed at any appropriate time, including concurrently, individually, or in combination, or performed by alternative components or systems. In addition, many of the operations in these processes may take place simultaneously, concurrently, and/or in different orders than as shown. Moreover, the illustrated systems may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computerized method performed by one or more processors, the method comprising:
    identifying a set of traits in an evolving multi-tenant enterprise cloud environment supporting an object-oriented system, wherein each trait represents a characteristic of an object in the object-oriented system, and where traits associated with at least some of the objects in the object-oriented system are customizable;
identifying a trait computation rules structure, wherein the trait computation rules structure includes a set of trait rules, wherein each trait rule is composed of expressions to determine whether a class or an object has a particular trait and corresponds to a distinct trait in the set of traits;
generating a trait data structure for the object-oriented system, wherein the trait data structure includes at least the set of traits and data structures corresponding to a distinct trait in the set of traits;
identifying a set of classes in the object-oriented system; and
for each class in the set of classes:
  constructing a metadata structure for the particular class; and
  for each trait in the trait data structure:
    identifying a trait rule corresponding to the particular trait in the trait computation rules structure;
    applying the trait rule to the particular metadata structure to generate a trait rule result;
    determining whether the particular class has the particular trait based on the trait rule result; and
    in response to a determination that the particular class has the particular trait, updating the trait data structure, wherein the updated trait data structure indicates that the particular class has the particular trait;
receiving a trait lookup query, wherein the trait lookup query includes a trait and an object, wherein the object is an instance of a class;
determining whether the trait data structure has information to solve the trait lookup query without using the metadata structure for the particular class of the object and without using a metadata structure for the object; and
in response to a determination that the trait data structure has the information to solve the trait lookup query, generating a trait lookup query response based on the trait data structure, wherein the trait lookup query response indicates that the object has the trait or the object does not have the trait.

2. The method of claim 1, further comprising:
in response to a determination that the trait data structure does not have the information to solve the trait lookup query, generating a trait lookup query response based on a metadata structure for the object, wherein the trait lookup query response indicates that the object has the trait or the object does not have the trait.

3. The method of claim 2, further comprising:
updating the trait data structure, wherein the updated trait data structure indicates the object has the trait or the object does not have the trait.

4. The method of claim 1, wherein the object-oriented system is a multitenant system, the method further comprising:
identifying a set of tenants in the object-oriented system; and
for each tenant in the set of tenants:
  generating a tenant trait data structure for the particular tenant, wherein the particular tenant trait data structure is a copy of the trait data structure;
  identifying a set of modified classes by the particular tenant; and for each modified class in the particular set of modified classes:
    constructing a metadata structure for the particular modified class; and
    for each trait in the tenant trait data structure:
      identifying a trait rule corresponding to the particular trait in the trait computation rules structure;
      applying the trait rule to the particular metadata structure to generate a trait rule result;
      determining whether the particular modified class has the particular trait based on the trait rule result; and
      in response to a determination that the particular modified class has the particular trait, updating the tenant trait data structure, wherein the updated tenant trait data structure indicates that the particular modified class has the particular trait.

5. The method of claim 1, wherein the set of traits includes at least one of heavy, light, encryptable, or editable.

6. The method of claim 1, wherein each data structure in the trait data structure is a heap.

7. The method of claim 1, wherein updating the trait data structure includes adding the particular class to a data structure corresponding to the particular trait in the trait data structure.

8. The method of claim 1, wherein the trait data structure is generated and updated during bootstrap time of the object-oriented system.

9. The method of claim 1, wherein the set of traits includes at least one of class level traits or object level traits, and wherein the trait data structure is updated during run-time of the object-oriented system for the object level traits.

10. A non-transitory computer storage medium encoded with a computer program, the program comprising instructions that when executed by one or more computers cause the one or more computers to perform operations comprising:
identifying a set of traits in an evolving multi-tenant enterprise cloud environment supporting an object-oriented system, wherein each trait represents a characteristic of an object in the object-oriented system, and where traits associated with at least some of the objects in the objects-oriented system are customizable;
identifying a trait computation rules structure, wherein the trait computation rules structure includes a set of trait rules, wherein each trait rule is composed of expressions to determine whether a class or an object has a particular trait and corresponds to a distinct trait in the set of traits;
generating a trait data structure for the object-oriented system, wherein the trait data structure includes at least the set of traits and data structures corresponding to a distinct trait in the set of traits;
identifying a set of classes in the object-oriented system; and
for each class in the set of classes:
  constructing a metadata structure for the particular class; and
  for each trait in the trait data structure:
    identifying a trait rule corresponding to the particular trait in the trait computation rules structure;
    applying the trait rule to the particular metadata structure to generate a trait rule result;
    determining whether the particular class has the particular trait based on the trait rule result; and
    in response to a determination that the particular class has the particular trait, updating the trait data structure, wherein the updated trait data structure indicates that the particular class has the particular trait;

receiving a trait lookup query, wherein the trait lookup query includes a trait and an object, wherein the object is an instance of a class;

determining whether the trait data structure has information to solve the trait lookup query without using the metadata structure for the particular class of the object and without using a metadata structure for the object; and in response to a determination that the trait data structure has the information to solve the trait lookup query, generating a trait lookup query response based on the trait data structure, wherein the trait lookup query response indicates that the object has the trait or the object does not have to trait.

11. The medium of claim 10, the operations further comprising:

in response to a determination that the trait data structure does not have the information to solve the trait lookup query, generating a trait lookup query response based on a metadata structure for the object, wherein the trait lookup query response indicates that the object has the trait or the object does not have the trait.

12. The medium of claim 11, the operations further comprising:

updating the trait data structure, wherein the updated trait data structure indicates the object has the trait or the object does not have the trait.

13. The medium of claim 10, wherein the object-oriented system is a multitenant system, the operations further comprising:

identifying a set of tenants in the object-oriented system; and for each tenant in the set of tenants:
generating a tenant trait data structure for the particular tenant, wherein the particular tenant trait data structure is a copy of the trait data structure;
identifying a set of modified classes by the particular tenant; and
for each modified class in the particular set of modified classes:
constructing a metadata structure for the particular modified class; and
for each trait in the tenant trait data structure:
identifying a trait rule corresponding to the particular trait in the trait computation rules structure;
applying the trait rule to the particular metadata structure to generate a trait rule result;
determining whether the particular modified class has the particular trait based on the trait rule result; and
in response to a determination that the particular modified class has the particular trait, updating the tenant trait data structure, wherein the updated tenant trait data structure indicates that the particular modified class has the particular trait.

14. The medium of claim 10, wherein the set of traits includes at least one of heavy, light, encryptable, or editable.

15. The medium of claim 10, wherein each data structure in the trait data structure is a heap.

16. The medium of claim 10, wherein updating the trait data structure includes adding the particular class to a data structure corresponding to the particular trait in the trait data structure.

17. The medium of claim 10, wherein the trait data structure is generated and updated during bootstrap time of the object-oriented system.

18. A system comprising:
one or more processors; and
a computer-readable medium storing instructions executable by the one or more processors to perform operations comprising:
identifying a set of traits in an evolving multi-tenant enterprise cloud environment supporting an object-oriented system, wherein each trait represents a characteristic of an object in the object-oriented system, and where traits associated with at least some of the objects in the object-oriented system are customizable;
identifying a trait computation rules structure, wherein the trait computation rules structure includes a set of trait rules, wherein each trait rule is composed of expressions to determine whether a class or an object has a particular trait and corresponds to a distinct trait in the set of traits;
generating a trait data structure for the object-oriented system, wherein the trait data structure includes at least the set of traits and data structures corresponding to a distinct trait in the set of traits;
identifying a set of classes in the object-oriented system; and
for each class in the set of classes:
constructing a metadata structure for the particular class; and
for each trait in the trait data structure:
identifying a trait rule corresponding to the particular trait in the trait computation rules structure;
applying the trait rule to the particular metadata structure to generate a trait rule result;
determining whether the particular class has the particular trait based on the trait rule result; and
in response to a determination that the particular class has the particular trait, updating the trait data structure, wherein the updated trait data structure indicates that the particular class has the particular trait;

receiving a trait lookup query, wherein the trait lookup query includes a trait and an object, wherein the object is an instance of a class;

determining whether the trait data structure has information to solve the trait lookup query without using the metadata structure for the particular class of the object and without using a metadata structure for the object; and in response to a determination that the trait data structure has the information to solve the trait lookup query, generating a trait lookup query response based on the trait data structure, wherein the trait lookup query response indicates that the object has the trait or the object does not have to trait.

* * * * *